Figure 1:
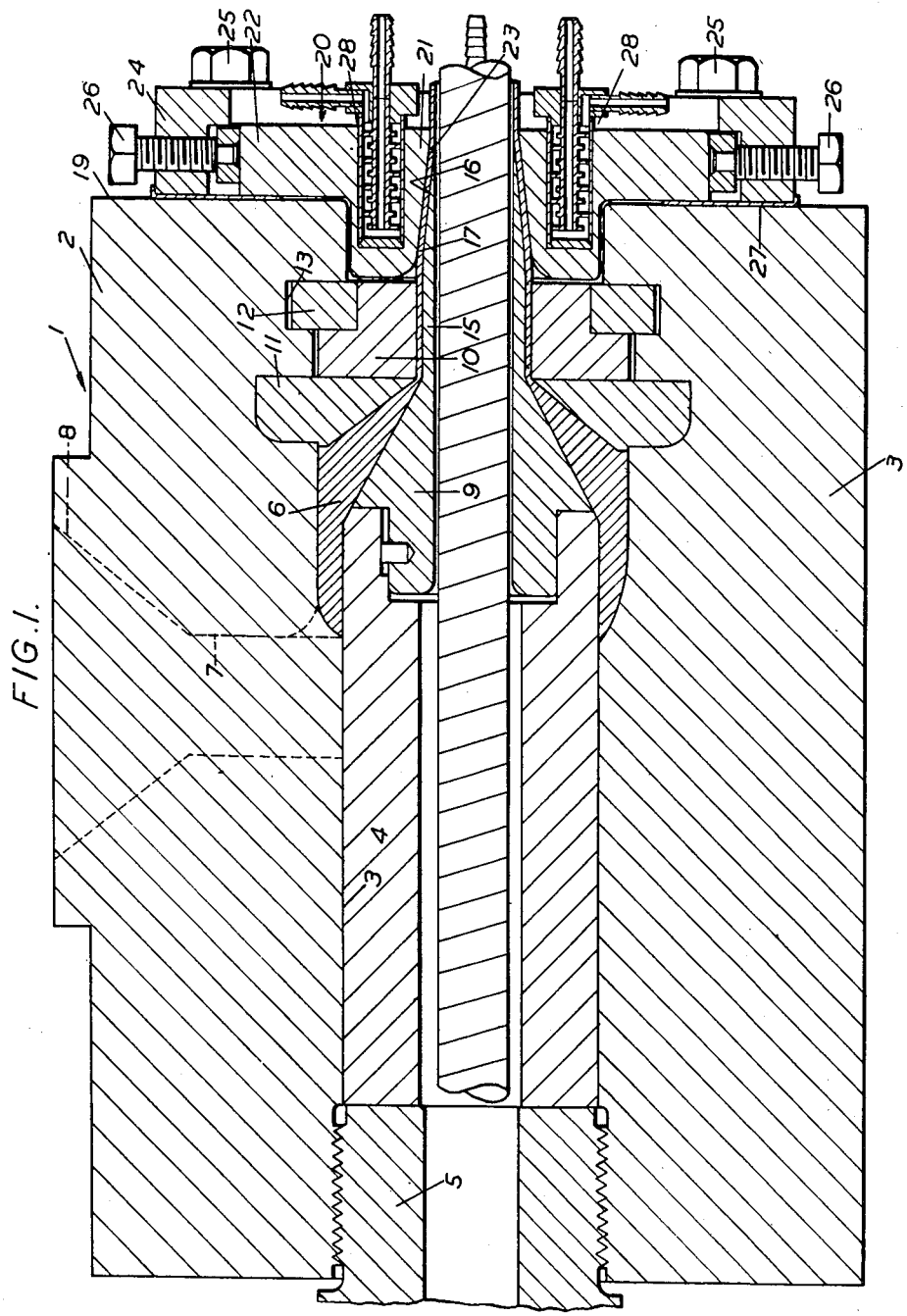

June 19, 1956  A. LATIN ET AL  2,751,077
EXTRUSION APPARATUS FOR SHEATHING ELECTRIC CABLES
Filed May 23, 1952

Inventors
Aubrey Latin, George Thomas Wilson Grieve and
James Conning
By
James G. Bedell
Attorney June 19, 1956     A. LATIN ET AL     2,751,077
EXTRUSION APPARATUS FOR SHEATHING ELECTRIC CABLES
Filed May 23, 1952     5 Sheets-Sheet 3
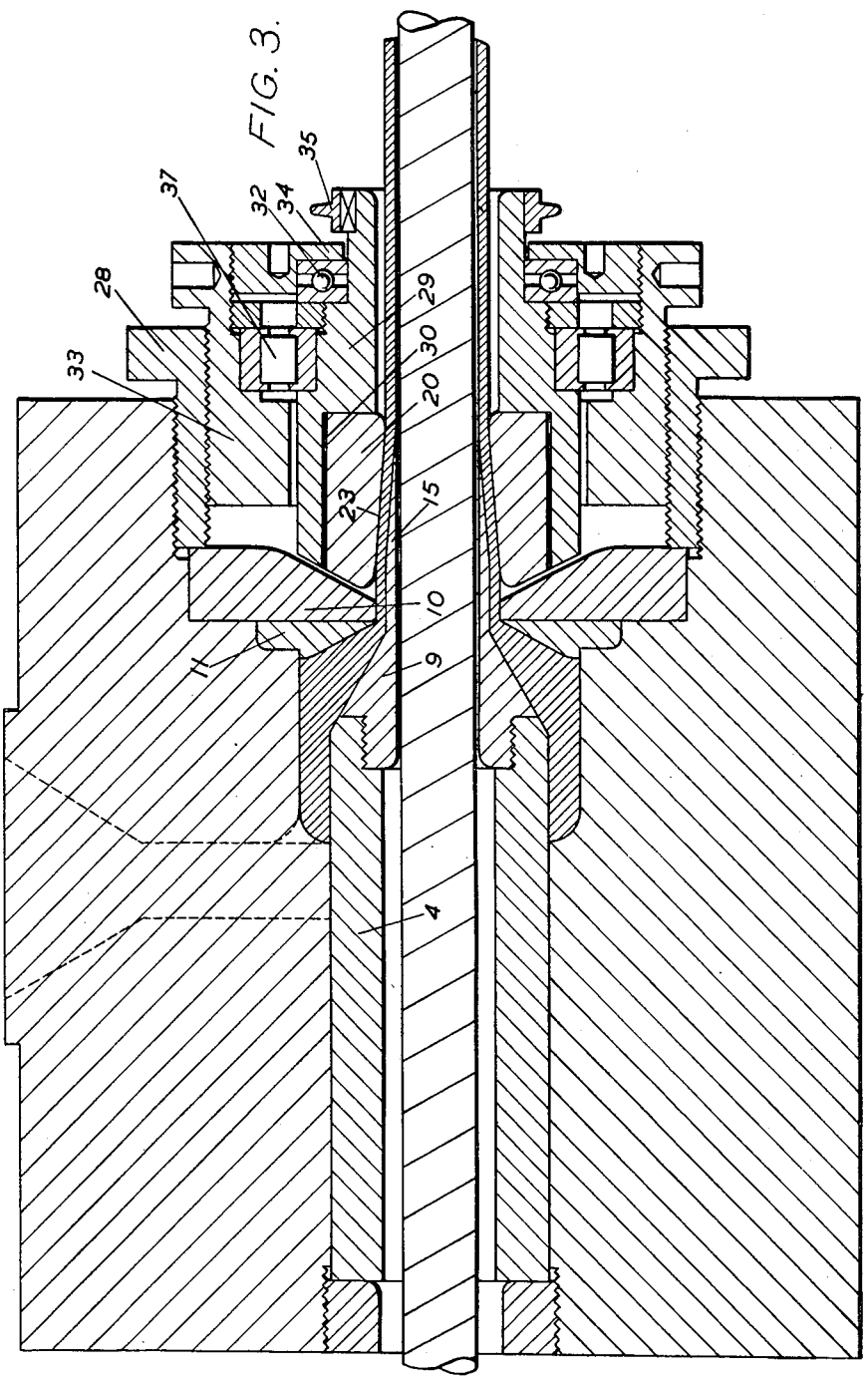

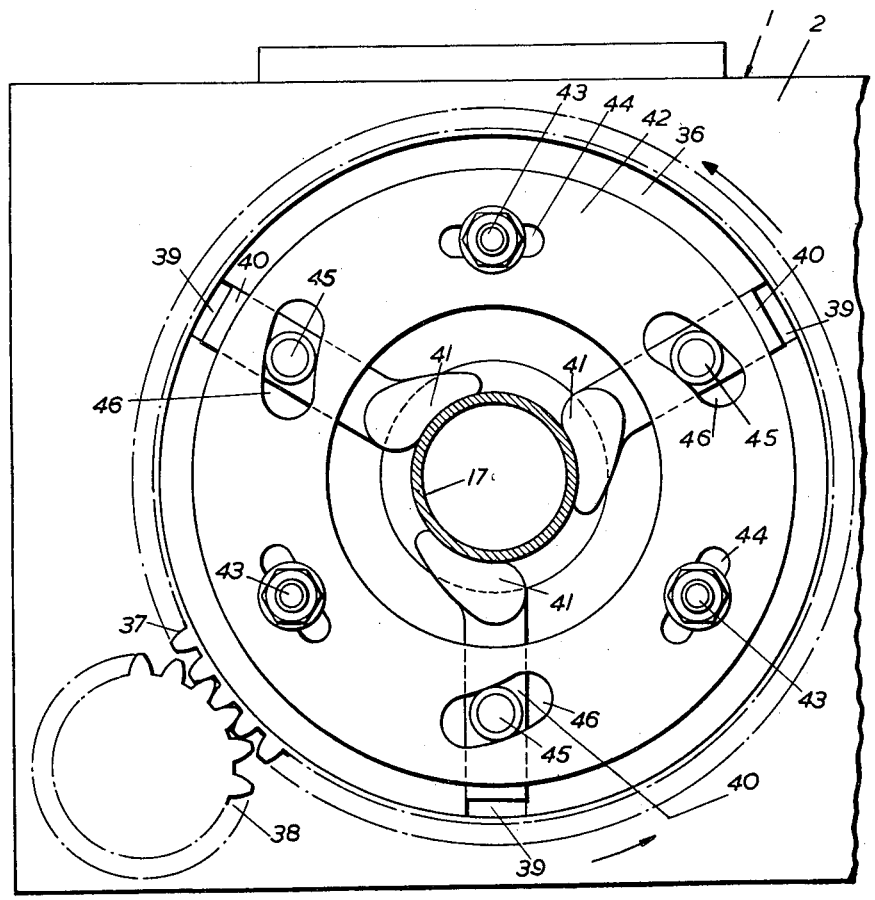

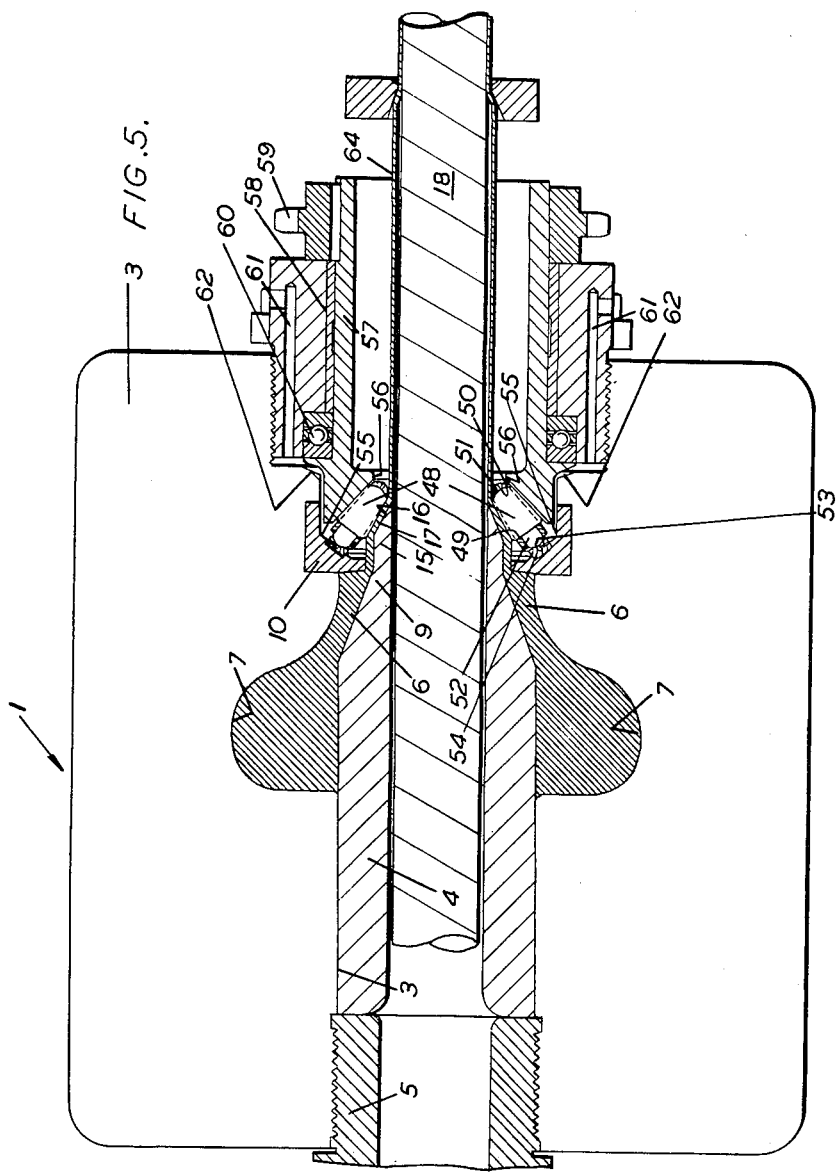

United States Patent Office 2,751,077
Patented June 19, 1956

2,751,077

EXTRUSION APPARATUS FOR SHEATHING ELECTRIC CABLES

Aubrey Latin and George Thomas Wilson Grieve, London, and James Conning, Bexley, England, assignors to The Okonite Company, Passaic, N. J.

Application May 23, 1952, Serial No. 289,618

2 Claims. (Cl. 207—4)

This invention relates to the manufacture of metal cable sheaths and pipes by extrusion processes and by the term "extrusion process" we mean a process in which a mass of metal in a plastic state is converted into an elongated body of the required cross-sectional shape by forcing the plastic metal through an appropriately shaped orifice. In the production of such sheaths and pipes it has been found difficult to maintain the wall thickness of the sheath or pipe constant within very close limits at all points around the circumference of the sheath or pipe and at all points along its length. Accordingly it has been the practice to produce a sheath or pipe whose average wall thickness is considerably above that of the minimum permissible wall thickness. This practice is safe but extravagant of material. The present invention aims at the production by a method involving an extrusion process, of a cable sheath or pipe of which the wall thickness is constant within fine limits, thereby enabling economies in material to be effected.

By the present invention we provide a method of manufacturing a metal cable sheath or pipe which comprises forming by an extrusion process, as hereinbefore defined, a metal tube and operating upon the internal and external surfaces simultaneously of each elemental length of the advancing tube so formed, to displace metal in a direction having a substantial circumferential component from elemental areas of wall of which the thickness is materially greater than the nominal thickness to elemental areas of wall of which the thickness is materially less than the nominal thickness. In this way inequalities in the wall thickness of the elemental length are substantially reduced and the wall of the formed tube is caused to assume a thickness that is, within close limits, constant throughout its circumference.

This circumferential displacement process may be and, where the tube is extruded about a cable core will usually be, accompanied or followed by a reducing process in which the size of the tube is reduced to that required for the finished cable sheath or pipe, as the case may be.

The method may be carried out by apparatus comprising an extrusion press or a rotary extrusion machine of any convenient form, which in accordance with a further feature of the invention is modified by the provision of the inner die or point of the press or machine of an extension which projects beyond the matrix of the press or machine to form an internal gauging member and by the provision of an external gauging member adapted to co-operate with the internal gauging member to exert a squeezing action upon tube wall of greater thickness than the nominal as it passes forward between them.

The invention will be more fully described with the aid of the accompanying drawings which show a number of examples of apparatus for carrying it out.

Figure 2:
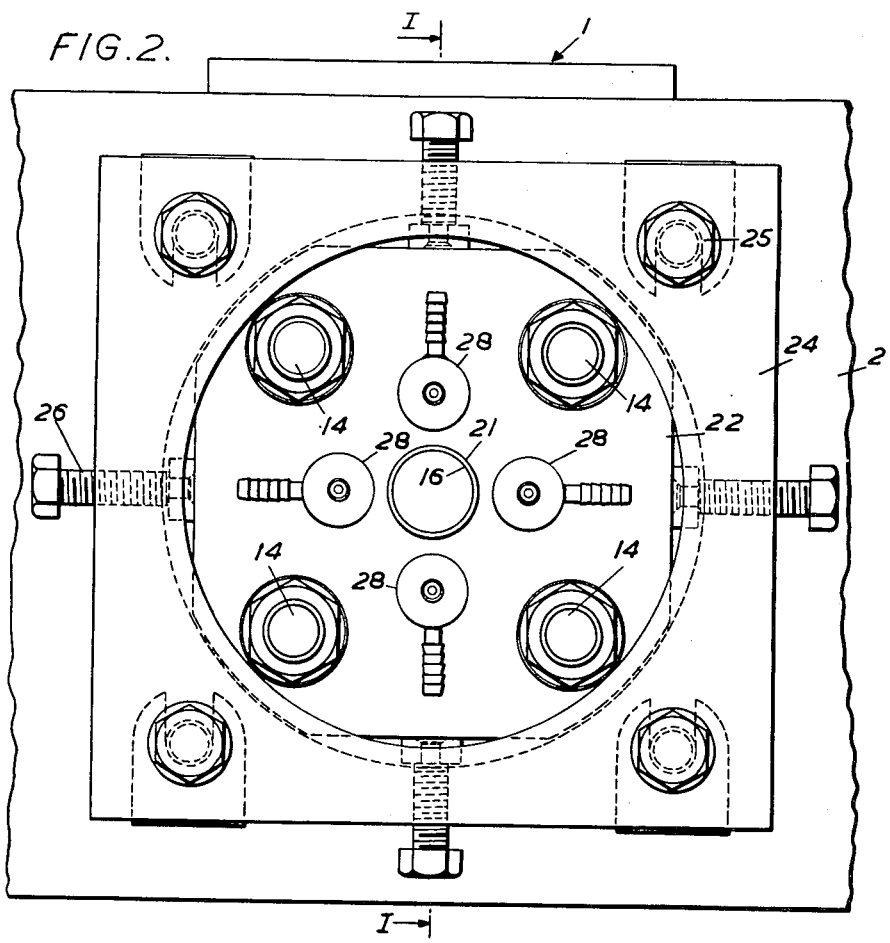
Figure 6:
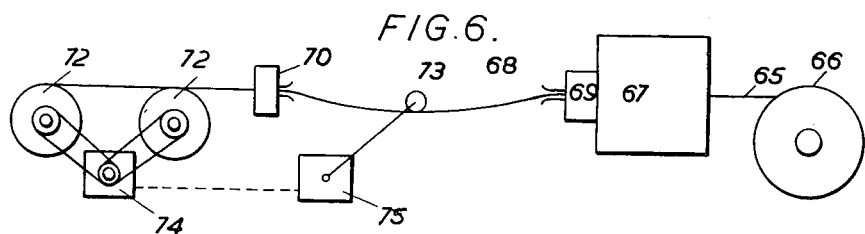

In these drawings:

Figure 1 is a longitudinal section of a die box of a lead extrusion press provided with one form of our gauging device for operating upon the internal and external surfaces of the extruded tubular product, Figure 2 is an end view of the die box shown in Figure 1, Figure 3 is a longitudinal section of a load press die box fitted with a second form of our gauging device, Figure 4 is an elevation illustrating a lead press die box fitted with a third form of our gauging device, Figure 5 is a sectional plan of a lead press die box fitted with yet another form of our gauging device and Figure 6 is a diagram showing a general arrangement for lead sheathing electric cables in accordance with the invention.

On referring to Figures 1 and 2 of the drawings it will be seen that the die box 1 consists of upper and lower parts 2 and 3 which make joint in a horizontal plane. The contiguous faces of these parts are recessed and the recesses co-operate to form a through bore. In the rear part 3 of this bore is positioned a tubular mandrel or point holder 4 which is held in place by a tubular nut 5 at its rear end. At the front end of the mandrel 4 the bore is enlarged to form between the mandrel and the wall of the passage an annular forming chamber 6 into opposite sides of which a pair of passages 7 lead from an opening 8 in the upper face of the die box. In the front end of the mandrel 4 is fitted an externally conical inner die or point 9. The inner die or point 9 co-operates with an outer die or matrix 10 to form an annular extrusion orifice at the front end of the forming chamber to which a converging cross-section is imparted by the conical surface of the point 9 and the conical recessed rear face of a masking ring 11 held in a circumferential recess in the enlarged part of the through bore. The matrix 10 is held in place and laterally adjusted by means of an adjusting ring 12 housed in a circumferential recess 13 at the front end of the through bore and positioned in the usual way by four wedge bolts 14. It will be appreciated that as far as it has been described the die box is of well known form. For carrying out our improved method of sheath or pipe manufacture, it is modified in two respects. The inner die or point 9 instead of terminating in the usual way at the rear face of the matrix 10, is furnished with an extension 15 which projects beyond the matrix to terminate in a part of which the external surface 16 constitutes an internal gauging member having a work-engaging surface which is circumferentially continuous and of a cross-sectional shape corresponding to the nominal cross-sectional shape of the extruded sheath or tube 17 which will, as shown, generally be of circular cross-section. Preferably the surface 16 is conical. The extension 15 is tubular to allow the passage of a cable core 18 but where coreless tubing only is to be produced there is of course no necessity for the point 9 and its extension 15 to be tubular. The work-engaging surface of the external gauging member may also be circumferentially continuous and of a cross-sectional shape corresponding to the nominal cross-sectional shape of the extruded tube 17. A stationary external gauging member of this kind is provided by mounting on the front end face 19 of the die box 1 a member 20 comprising a hub 21 and a peripheral flange 22. The former has a central opening with a conical surface 23 which forms the work-engaging surface of the external gauging member which is adapted to co-operate with the conical surface 16 of the internal gauging member 15 to exert a squeezing action on parts of the wall of the extruded tube 17 that are of greater thickness than the nominal, as the tube passes forward between them.

It will be seen that the internal and external gauging members 15 and 20 form an annular orifice of gradually diminishing diameter, the external gauging member thus also constituting a sinking die surrounding the internal gauging member. With such gauging members the circumferential displacement action which they have upon the extruded sheath or tube is accompanied by a cross-sectional reducing process. Reduction in cross-section to be imparted by the gauging device will preferably be kept as low as possible having regard to the provision of a stable support for the inner gauging member. The external gauging member is held in place by a frame 24 secured to the front face of the die box 1 by screws 25 and adjustably positioned laterally with respect to the internal gauging member by means of adjusting bolts 26 which bear upon flats on the peripheral edge of the flange 22. Correct spacing between the conical gauging surfaces 16 and 23 is ensured by inserting shims 27 of the thickness required between the flange 22 and the front face 19 of the die box. These shims are provided one at each frame screw 25. The work-engaging surface of the external gauging device is maintained at an appropriate temperature by means of a number of coolers 28, each comprising a pair of concentric tubes with a baffled annular passage between them along which coolant is caused to flow.

Where the extruded tube is nominally of circular cross-section, the outer gauging member may be given a rotary movement about the axis of the extruded sheath or tube with the object of assisting circumferential displacement of metal from one part of each elemental length of tube to another part of the same or an adjacent length by what may be regarded as an ironing action. An arrangement of this kind is shown in Figure 3. As will be seen, the mandrel 4, the inner die or point 9 and the internal gauging device 15 are similar to those of the die box shown in Figures 1 and 2. The outer die 10 however is held in place by a tube nut 28 screwing in the enlarged front end of the passage through the die box. The outer gauging member 20 differs in shape from that shown in Figures 1 and 2 although its work-engaging surface 23 is similar. It is housed within one end of a sleeve 29 and is splined thereto at 30. The sleeve 29 is rotatably supported by a roller bearing 31 and a ball thrust washer 32 within a stationary sleeve 33 which screws into the tube nut 28. The front end of the sleeve 29 projects beyond the thrust washer 32 and its abutment 34 and carries a gear wheel 35 by which a rotary drive can be applied through the sleeve to the external gauging member 20.

Instead of an external gauging member consisting of a rotatably driven sleeve such as has been described with reference to Figure 3, there may be employed an external gauging member consisting of two or more shoes having work-engaging surfaces which revolve round the extruded tube with which they have a circumferentially limited length of contact so as to have a more localised and more intense circumferential displacing action upon the metal of the extruded tube. These shoes will naturally be distributed uniformly around the periphery of the tube to avoid placing a unilateral bending moment upon the co-operating internal gauging member. Figure 4 shows an example of a die box fitted with an external gauging member of this kind. Rotatably mounted at the front end of the die box 1 is a centrally apertured disc 36 having a toothed rim 37 by which it can be driven in rotation about the axis of extrusion by means of a driving pinion 38. In the front face of the disc 36 are three radially extending grooves 39 spaced 120° apart. Each groove houses a shank 40 of a shoe 41. The shoe shanks are held slidably in the grooves 39 by a cover plate 42 clamped to the disc 36 by stud bolts 43 which pass through arcuate slots 44 in the cover plate so that the cover plate is capable of being angularly adjusted relative to the disc 36 to a limited extent determined by the circumferential length of slots 44. Each shoe shank 40 carries a stud 45 which projects through an arcuate slot 46 in the cover plate. These slots 46 do not extend circumferentially with respect to the disc 36 and its cover plate but lie at a small angle to the circumferential so that as the cover plate is rotated relative to the disc the radial positions of the three shoes are adjusted simultaneously and to the same extent as one another in inward or outward directions depending upon the direction of rotation of the cover plate relative to the disc.

In place of two or more shoes we may use rollers, each capable of rotating about its own axis as it is carried round the extruded tube. Figure 5 shows an example of a die box fitted with a multiple roller external gauging device. These rollers 48 are of frustro-conical form and set in a cage 49 at such an angle that the roll surface converges slightly with respect to the work-engaging surface 16 of the internal gauging member 15 as the axis of extrusion is approached. The end face 50 at the small end of each roller is a spherical surface and is seated in a spherical bearing 51 formed in the adjoining part of the cage. The other end of the roll carries a cylindrical stub 52 which projects beyond the cage 49 and terminates in a spherical surface 53 which seats in a Michel thrust pad 54 which is supported by a conical face 55 on the outer die or matrix 10. The rolls 48 are driven in rotation about the inner gauging device by engagement with a conical face 56 on the inner end of a driving sleeve 57 supported in a bearing 58 housed in the enlarged end of the bore of the die box 1 and driven by means of a gear wheel 59 on the projecting end of the driving sleeve. End thrust between the driving sleeve 57 and its bearing 58 is taken up by a ball thrust washer 60. The rolls and their bearings are lubricated with liquid lubricant, preferably bitumen, which is fed to the bearings through passages 61 and 62 and escapes through the large annular clearance between the extruded sheath and the driving sleeve 57. Adjustment of the work-engaging surface of the internal gauging member 15 may be obtained by the use of sets of Michel thrust pads 54 of different thicknesses and providing for axial adjustment of the driving sleeve 57.

Where the circumferential displacement process for reducing inequalities in the wall thickness of the tube is to be followed by a reducing process for reducing the diameter (or other transverse dimensions) of the tube, the tube may be pulled through a sinking die. Such a die is shown at 63 in Figure 5. It acts upon the rolled sheath 64 as it emerges from the driving sleeve 57, to reduce the sheath in diameter to make it fit the cable core 18. Sinking dies may be similarly located in front of the extruding and gauging devices shown in Figures 1 to 4. Instead of being located close to the die box, as shown in Figure 5, the sinking die may be located some considerable distance in front (i. e. ahead in the direction of travel of the extruded tube) of the extrusion die and gauging device to permit of the application of one of the many known forms of device for enabling the speed of drawing through the sinking die to be co-related to the speed of extrusion. An example of such an arrangement is shown diagrammatically in Figure 6, where cable core 65 is paid out from a reel 66 and passed through a cable sheathing press 67. The sheathed cable 68 emerging from the press 67 and sheath gauging device 69 is allowed to form a slight loop between the gauging device and a sinking die 70 through both of which it is drawn by a capstan 71 and then wound on a take-up reel 72. A jockey roller 73 rides on the loop and as it rises and falls due to variations between the speed of delivery of the sheathed cable from the gauging device 69 and the speed of entry into the sinking die 70, which is proportional to the linear speed of the capstan 71, it adjusts in the appropriate direction a motor speed-regulating device 75 controlling the speed of the motor 74 driving the capstan 71 and so maintains an appropriate tension upon the part of the sheath between the gauging device and the sinking die. Alternatively, where sufficient space is available between the sinking die and the gauging device, we may provide for an accumulation of slack before beginning to pull the tube through the sinking die and so avoid the need for close co-ordination of the speed of drawing the tube through the sinking die with the speed of extrusion and of advancement through the gauging device. In this case additional haul-off means may be required to apply some tension to the sheath to assist its passage through the gauging device. Suitable slack-accumulating means are described in the specification of United States application Serial No. 103,722 of which we are part proprietors.

In some cases it may be practicable to dispense with a sinking die in advance of the gauging device and rely on that device to reduce the extruded tube to the full extent required.

The gauging device may, as shown in the drawings, be placed as close as possible to the extrusion dies so that it operates on the wall of the tube when hot and therefore in a relatively soft state. This reduces the forces required to effect any circumferential displacement of metal that may be necessary, and, where the circumferential displacement process is to be accompanied by a cross-section reducing process, reduces the risk of ballooning the tube between the extrusion dies and the gauging device. It also reduces any tendency of the internal gauging member to be deflected from its axial position. Alternatively, the gauging device may be spaced from the extrusion dies sufficiently to permit of artificially cooling the extruded tube before it is operated upon by the gauging device, to reduce to a minimum the possibility of flow induced by the operation of extrusion persisting in the extruded tube beyond the point at which the tube enters the gauging device and adversely affecting the tube after it has left the gauging device. This cooling may be effected by an air blast, or a water spray or it may be effected by surrounding the tube leaving the extrusion dies with a jacket in which the coolant may or may not be under super-atmospheric pressure. As mentioned for example in connection with Figure 5, means may also be provided for lubricating the tube before it passes into the gauging device. External lubrication will generally suffice but internal lubrication may be provided in addition if required.

Where the tube is extruded around a core, as in the case of a cable sheath, the core will generally provide sufficient support for the drawn down tube to allow a pull to be applied to the sheath by means of a haul-off capstan or the like sufficient to advance the sheath successively through the gauging and reducing devices or, where these are combined, through the combined gauging and reducing device. In the case of a coreless tube a caterpillar type of haul-off device may be used and local support given to the tube by a further extension on the inner extrusion die which projects beyond the internal gauging die to the region of the application of pressure by the haul-off device.

Although the invention is primarily intended to be applied to the manufacture of lead and lead rich alloy cable sheaths, it may also be applied to the manufacture of cable sheaths of aluminium or other metal that is suitable for such purposes and can be extruded satisfactorily at reasonable temperatures.

What we claim as our invention is:

1. Extrusion apparatus for sheathing electric cables, said apparatus comprising, in combination, a die box consisting of upper and lower parts making joint in a horizontal plane, the contiguous faces of said parts being provided with cooperating recesses to form a through-bore; a tubular mandrel in said bore; an annular metal-charging chamber about the forward end of said mandrel; an externally conical, tubular inner die attached to the forward end of said mandrel and axially aligned therewith; an outer die cooperating with said inner die to form an annular extrusion orifice at the front end of said chamber; a masking ring having a tapered rear face set into said metal-charging chamber and cooperating with the conical surface of said inner die to impart a converging cross-section to said extrusion orifice for the formation of a sheath of nominal wall thickness; an extension on the forward end of said tubular inner die projecting beyond the outer die, the external surface of said extension providing an internal gauging member having a circumferentially continuous work-engaging surface; and a member composed of an annular flange and a hub mounted on the front end of the said die box, said hub having a conical opening which receives the said internal gauging member, the conical surface of said conical opening cooperating with the external surface of the internal gauging member to exert a squeezing action on parts of a sheath being extruded that are of greater thickness than the nominal.

2. Extrusion apparatus for sheathing electric cables, said apparatus comprising, in combination, a die box consisting of upper and lower parts making joint in a horizontal plane, the contiguous faces of said parts being provided with cooperating recesses to form a through-bore; a tubular mandrel in said bore; an annular metal-charging chamber about the forward end of said mandrel; an externally conical, tubular inner die attached to the forward end of said mandrel and axially aligned therewith; an outer, laterally adjustable die cooperating with said inner die to form an annular extrusion orifice at the front end of said chamber; a masking ring having a tapered rear face set into said metal-charging chamber and cooperating with the conical surface of said inner die to impart a converging cross-section to said extrusion orifice for the formation of a sheath of nominal wall thickness; an extension on the forward end of said tubular inner die projecting beyond the outer die, the external surface of said extension being conical and providing an internal gauging member having a circumferentially continuous work-engaging surface; and a member composed of an annular flange and a hub mounted on the front end of the said die box, said hub having a conical opening which receives the said internal gauging member, the conical surface of said conical opening cooperating with the external surface of the internal gauging member to exert a squeezing action on parts of a sheath being extruded that are of greater thickness than the nominal.

References Cited in the file of this patent

UNITED STATES PATENTS

| 2,233,106 | McGuire | Feb. 25, 1941 |
| 2,234,340 | Gillis | Mar. 11, 1941 |
| 2,262,716 | Wolfer | Nov. 11, 1941 |

FOREIGN PATENTS

| 544,386 | Great Britain | Apr. 10, 1942 |
| 655,322 | Germany | Jan. 24, 1934 |